United States Patent [19]

Recla

[11] Patent Number: 5,301,538

[45] Date of Patent: Apr. 12, 1994

[54] PROCESS AND APPARATUS FOR DISTRIBUTED WIDE RANGE LEAK DETECTION, LOCATION AND ALARM FOR POLLUTANTS

[75] Inventor: Dennis Recla, Garland, Tex.

[73] Assignee: Teledyne Industries, Inc., Huntsville, Ala.

[21] Appl. No.: 870,999

[22] Filed: Apr. 20, 1992

[51] Int. Cl.$^5$ ............................................. G01M 3/18
[52] U.S. Cl. ................................. 73/40.5 R; 340/605
[58] Field of Search .................. 73/40.5, 40.7, 49.2 T, 73/49.1, 40; 340/605

[56] References Cited

U.S. PATENT DOCUMENTS

| | | | |
|---|---|---|---|
| 1,041,156 | 10/1912 | Payne | 73/40.5 R |
| 3,402,596 | 9/1968 | Woodruff | 73/40.7 |
| 3,600,674 | 8/1971 | Roberts et al. | 73/40.5 R |
| 3,723,987 | 3/1973 | Barone, Jr. et al. | 340/527 |
| 3,884,077 | 5/1975 | Athy, Jr. | 73/40.5 R |
| 3,964,292 | 6/1976 | Jackson | 73/40.5 R |
| 3,977,233 | 8/1976 | Issel | 73/40.5 R |
| 4,144,743 | 3/1979 | Covington et al. | 73/40.5 R |
| 4,618,855 | 10/1986 | Harding et al. | 73/40 |
| 4,735,095 | 4/1988 | Issel | 83/864.81 |
| 5,046,353 | 9/1991 | Thompson | 73/40.5 R |

OTHER PUBLICATIONS

Issell, Dr. Wolfgang: "Report on a Test to Establish the Suitability of a Leak Detection System for Pipelines"; Rhein-Westfalia Technical Supervisory Committee; Oct. 8, 1981.
Issell, Dr. Wolfgang: "New alarm system permits early detection of small leaks", Pipeline Industry, Dec. 1983.
Gardner, Carolyn C.: "Aspirated Vapor Monitoring for Underground Storage Tanks"; Air & Waste Management Association, Pittsburg, Pa.; Jun. 24, 1990.
Speri, Jay L.: "LASP Installation on the Point Arguello Natural Gas Line"; Proceedings of the 1991 API Pipeline Conference; American Petroleum Institute, Dallas, Tex.; Apr. 23, 1991.
Speri, Jay L.; "System pinpoints leaks on Point Arguello Offshore Line"; Oil & Gas Journal; Sep. 9, 1991.
Martin, Michael V.: "New Vapor Method Detects and Locates Leaks from Pipelines"; Speech presented at American Society of Testing Methods-Symposium on Leak Detection; New Orleans, La.; Jan. 29, 1992.
Recla, Dennis (Inventor herein): Confidential Invention Disclosure Form for (subject) Invention: "Distributed Wide Range Leak Detection Sysem"; Apr. 15, 1992.

Primary Examiner—Hezron E. Williams
Assistant Examiner—Michael Brock
Attorney, Agent, or Firm—Charles C. Garner

[57] ABSTRACT

Duel sensor detector tube systems are installed along the path length of a pipeline, storage tanks, or other fuel system to be monitored for leaks. One sensor detector tube system is constantly evacuated and passed through a sensor detector to test for presence of vapors or gaseous indications of large leaks. Concurrently, the other sensor detector tube system is permitted to lie dormant for a predetermined period to absorb and receive diffusion of vapors or gases from medium to small leaks that are too small to be detected by the continuous air flow system of the first tube. Periodically the flow of the two sensor detector tube systems is interchanged to evacuate the dormant tube, and it then becomes the continually aspirated system. Signal output from the sensor detectors provide data to the control alarm system which compares concentration profiles of current on-going tests with recorded profiles of prior tests, and any significant deviation is recognized as a problem, sounding an alarm. The system provides direct data for location of small leaks, with significant indications for location of large leaks.

11 Claims, 4 Drawing Sheets

PROCESS AND APPARATUS FOR DISTRIBUTED WIDE RANGE LEAK DETECTION, LOCATION AND ALARM FOR POLLUTANTS

FIELD OF THE INVENTION

This invention relates to the field of leakage detection, location and alarming for monitoring oil and gas pipelines, storage tanks and fuel handling systems and the like, and a process and an apparatus for detecting said leakage.

BACKGROUND OF THE INVENTION

CONTINUOUSLY MONITORING oil, gas and chemical pipe lines and tanks for small and large leaks has been a problem for a long time. In some areas, authorities require strict surveillance for small leaks, less than one gallon per day, as well as rapid detection and reporting of large leaks to protect the environment.

None of the usual methods, including comparison of flow or pressure differences, periodic pressure testing, and pig techniques have offered satisfactory detection sensitivity or leak location. This invention was conceived and developed to meet this need.

Other systems for testing for leaks have relied on indirect, inferential detection. That is, a condition caused by the leak, such as pressure loss or volume imbalance, was first detected and used as an indication of a leak. Later systems developed for direct sampling for presence of vapors or gases from leaks have used continuous aspiration of air samples for detection of large leaks, but involve too much dilution of the sample to be able to detect medium to small leaks. Later systems developed for testing of columns of dormant air samples for presence of diffused vapors or gaseous indications of leaks have been effective for detecting and locating small leaks, but depend on cycle testing involving prolonged periods of dormancy for adequate time for diffusion, and thus do not provide the quick, early emergency response required for large leaks.

The present invention is a dual, periodic air-sampling system for small leaks, combined with constant displacement or aspiration of continual flow of a column of air, developed because conventional leak-detection systems did not offer satisfactory sensitivity and rapid response for leak location.

This invention is able to provide direct leak detection instead of inferential, and it provides both cycle, periodic testing for diffusion from small leaks, combined with continuing, rapid sampling for large leak. That is, the leaking liquid or gas itself is detected, not a condition caused by the leak, such as pressure loss or volume imbalance. This system is not affected by operational transients and ambient conditions existing in the soil.

Before development of this invention, the original diffusion detection system was built to detect extremely small leaks of 0.4 l./day on a liquid pipeline, over a long period of time. To do this it evacuated, displaced or pulled the air out of the sensor tubing just once every day. This allowed the leaking fluid's vapor to form quite a large concentration slug in the sensor tube, large enough for the detector to sense an extremely small leak. This original system provided for leak detection alarming once every 24 hours, but most environmental authorities today require a continuous monitoring and alarming leak-detection system which would alarm on any dangerous leak within 30 minutes, not 24 hours. For early response, such a system requires the set up of a detector-pump unit to evacuate the sensor tube continuously. Such continuous evacuation sensing is needed to provide the emergency response mode. But the emergency response mode would not detect small leaks which require long periods of diffusion for detection.

For an improved system to meet the latest environmental requirements for combined reliable detection for small leaks concurrently with emergency response for large leaks, the following was required:
- Continuous leak-detection monitoring and alarming.
- Response to any leak within 30 minutes.
- All installations less than 18 inches above grade.
- Length of monitored right-of-way more than 10 miles.
- Accessibility.
- Not an obstacle or an eyesore.

Such a system would need to operate in two different modes: The low-level leak detection mode similar to the original patented leak alarm system for pollutants, and the emergency-response mode for high-level rapid detection of large leaks.

DETAILED DESCRIPTION OF THE INVENTION

The "Process and Apparatus for Distributed Wide Range Leak Detection, Location and Alarm for Pollutants" provides continual monitoring, direct detection and location of a wide range of all sizes of leaks, from small leaks to medium and large leaks. It provides quick detection time. It provides constant direct testing for the presence of pollutants from medium and large leaks in an uninterrupted flow of test media within one sensor tube, while concurrently and alternately performing periodic cycle testing for the presence of diffusion from medium and small leaks in the other sensor tube. The system provides continual testing of the flow of test media from one of the sensor tubes while concurrently and alternately, continual testing for presence of small amounts of pollutants from diffusion.

The subject invention uses two sensor tubes. Two sensor tubes are arranged substantially parallel, along the path and in vicinity of the pipe line, tanks or fuel systems to be monitored. While one sensor tube is being continually pumped with its test media flowing past the sensing device, the other sensor is alternately lying dormant for selected periods of time, for receiving incoming diffusion of vapors from medium and low level leaks.

Each sensor tube is a hollow conduit, typically about one-half inch internal diameter, constructed to permit diffusion of liquid, vapors or gaseous substances to enter thereinto through the walls of the conduit. Ordinary industrial conduit, such as polyvinyl chloride (PVC) or equivalent types well known in the industry, will be useful for this purpose and will be constructed to have openings in the walls to permit entrance of diffused gases, such as holes, slots or pores, and alternately may be of a sealed semipermeable membrane, such as ethylene vinyl acetate (EVA) tubing. This type of membrane will allow vapors to pass through but blocks liquids. In a preferred embodiment, the sensor tube will be of a patented design constructed in three layers with a perforated inner support tube, covered by a layer of semipermeable membrane, and the two covered with an outer protective mesh sheath to inhibit physical damage to the tube.

The elements of the subject invention include two sensor tubes; a pump; a sensor detector; a control valve for alternately directing flow of test medium from either of the sensor tubes, and a system of instrumentation, controls and computer.

The test medium in the preferred embodiment is standing air, and alternatively may be water or other inert liquid or gas to absorb vapors, gases or radiation from pollutants and convey them past a sensor for testing.

The sensor detector is sensitive to the presence of pollutants that may be found in the test medium. The pump is used to displace and move the test medium through the sensor tubes; and past the sensor detector.

Figure 1:
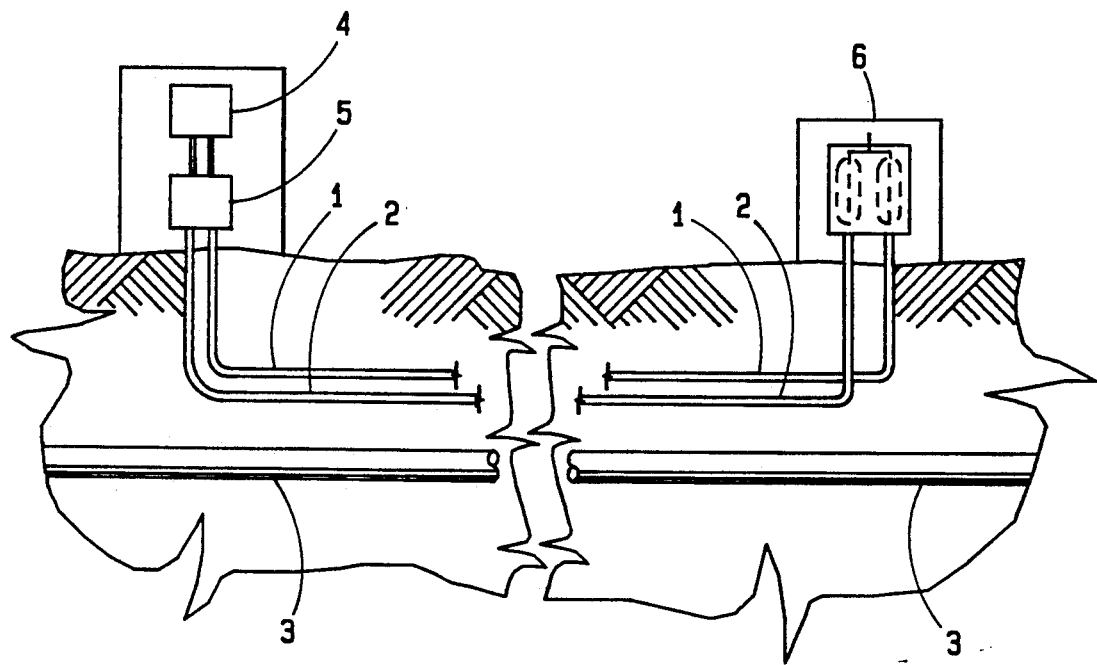
FIG. 1 shows a typical installation of the invention, with two sensor tubes located underground, along the path of a pipeline to be monitored.

FIG. 1 shows two sensor tubes 1 and 2 located along the path of the pipeline 3 to be monitored. The pump 4 and sensors 5 will be typically located at one end. Although not essential, an intake filter and dryer 6 may be installed to prevent the entrance of moisture or other contaminants into the test medium.

Figure 2:
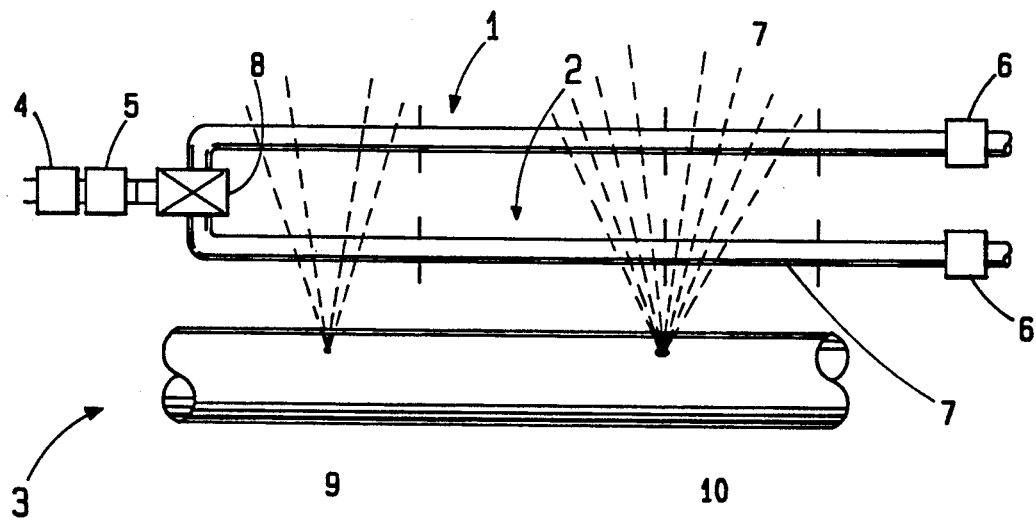
FIG. 2 is a functional diagram showing emission and dispersion of pollutants from a small leak, and alternately from a large leak, saturating the areas of the two sensor tubes.

FIG. 2 is a functional diagram of two sensor tubes 1 and 2 located along pipe line 3, with pump 4 and sensor detector 5 located at one end, and with dryers 6 located at intakes of sensor tubes 1 and 2. Test medium 7 is contained within sensor tubes 1 and 2. Control valve 8 is shown for alternate, sequential direction of flow from, either one of the sensor tubes I and 2 to the sensor 5. A small leak 9 and a small leak 10 are shown in the pipe line 3, emitting gas, vapors or radiation from escaping pollutants.

Figure 3:
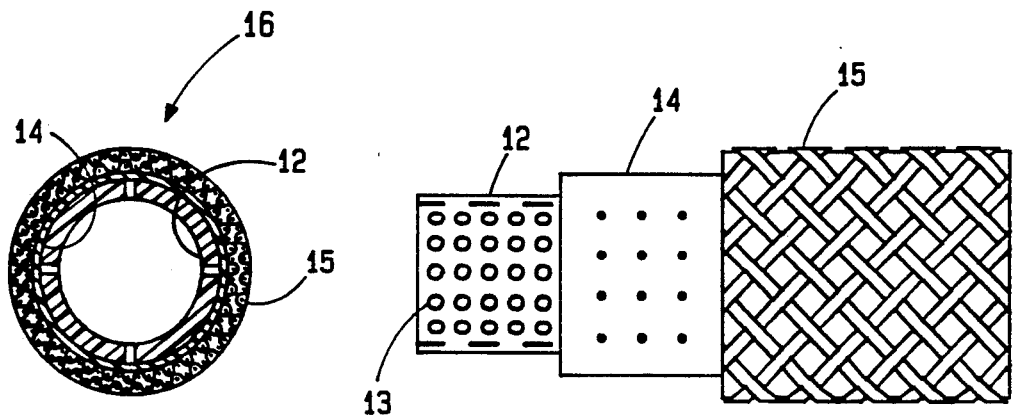
FIG. 3 shows construction of the preferred embodiment of the sensor tube hollow conduit.

FIG. 3 shows construction of a preferred embodiment of the sensor tube hollow conduit 16, of a patented design, using semipermeable membrane 14 which allows vapors to pass through the walls and into the conduit but blocks liquids. The inner tube 12, with perforations 13 in the walls thereof, is a hollow, perforated conduit 12 which transports the vapors of the suspected pollutant to the sensor detector after they pass through the membrane 14. The outer layer 15 of the patented sensor tube 16 is a protective woven mesh sheath whose sole purpose is to protect the thin outer membrane.

Figure 4:
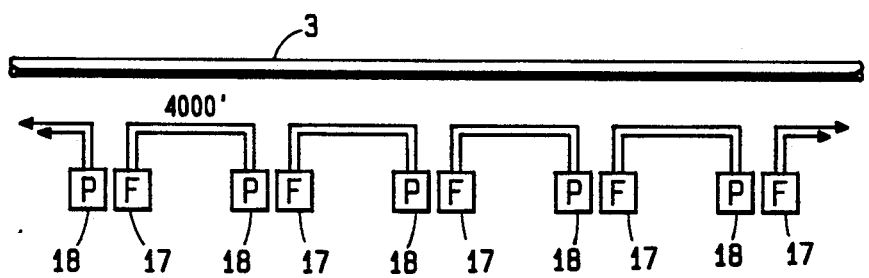
FIG. 4 is a schematic diagram of multiple installations of the invention, shoulder to shoulder, along an extended length of pipeline of perhaps ten miles.

FIG. 4 shows a typical application of the invention as installed in the field along a length of pipeline, tanks or other type of pollution source to be monitored. Typically, a pipeline application will be in extended lengths of many miles or more, and a system to monitor the entire length will require installation of a number of units of this invention, shoulder to shoulder, to provide continual coverage along the path. While this invention may be constructed and operated in units of various lengths, the practical length will be determined by required response time and rate of flow of the test medium. While one of the dual sensor tubes is in constant, uninterrupted flow for immediate detection of medium and larger leaks, the other sensor tube is alternately lying dormant to allow diffusion of medium to small leaks, and is then cyclically pumped past the sensor detector for testing. The length of time to pump the test medium from the dormant sensor tube past the sensor detector will be determined by the length of the tube and rate of flow. Thus the length of a unit of this invention for installation in the field will be designed to achieve desired maximum response time. In a preferred embodiment, a practical flow velocity of air as test medium has been found to be pumped at a velocity in the range of 2.7 to 3.0 feet per second. With nominal flow velocity of 2.7 feet per second, and recommended detection time of 30 minutes per cycle, the optimum length of installed sensor conduit between the intake filter and the pump/sensor detector unit will be less than 4,000 feet. Thus, a pipeline of ten miles in length will normally require installation of approximately thirteen to fourteen systems or modules of this invention.

Thus, in FIG. 4, typical units of this invention are shown installed, shoulder to shoulder, in lengths of approximately 4,000 feet each between the intake filter units 17 and the pump/sensor detector 18. It will be seen that for a pipeline of ten miles length, i.e. 52,800 feet in length, 13.2 units of this invention will be required for coverage of the pipeline.

Figure 5:
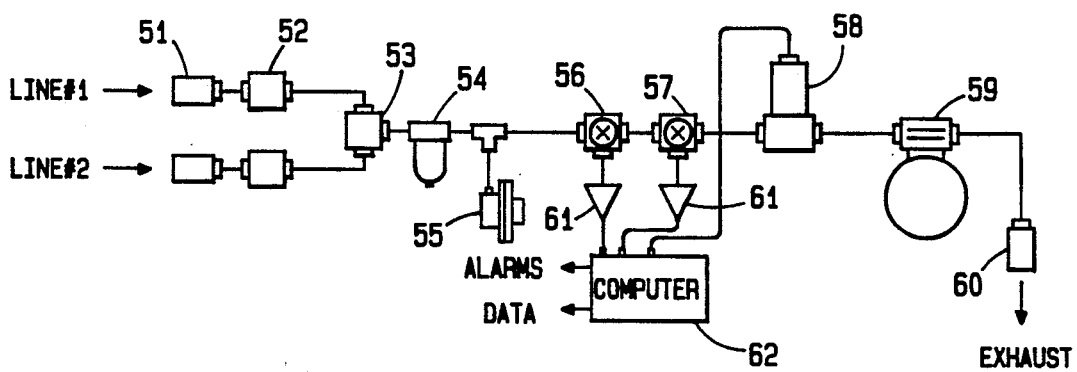
FIG. 5 shows a diagram of a typical sensor control unit for this invention, with preferred components.

FIG. 5 shows a diagram of a typical detector sensor control unit for this invention. The detector sensor control unit as shown in FIG. 5 contains the vacuum pump 59, solenoid valve 53, flow controller 58, and sensor gas detectors 56 and 57 needed to analyze the contents of the two sensor tubes, Lines I and 2. In FIG. 5, the pump 59 works under vacuum to draw the air, and alternatively any other suitable test medium, past the sensor detectors 56 and 57. The flow control device 58 is used to maintain a constant flow rate through the system. A computer 62 is used to operate the electronic controls of the detector sensor unit and to gather, analyze and record data from each of the tests during the continual, on-going testing operations. The detector sensor control unit is enclosed and secured to a mounting skid, and opens up to the operator. A positive ventilation system in the enclosure, not shown here, runs continually to cool the vacuum pump 59 and other heat generating devices in the unit.

In FIG. 5, air test medium, from each of the sensor tubes Lines I and 2, as controlled by three-way select valve 53, is ;/alternately pulled into the system by the vacuum pump 59. A filter 54, as shown in FIG. 5, is a conventional in-line air filter that is not necessary for this invention but is typically used here to remove any small dust particles or moisture that may have been trapped in the line. The air test medium first goes through a flash arrestor 51, and then to a safety solenoid valve 52 that is normally closed. This valve 52 is open whenever the pump is running and closes if power is lost or the pump 59 is shut off. The three-way select solenoid valve 53 is used to select which of the two dual sensor lines 1 and 2 are to be used at any one time. From this valve 53, the suction line goes through a line filter 54, not necessary to this invention, to a vacuum switch gauge 55 used to monitor the operation of the system. From here the line goes to sensors 56 and 57 which are used to detect various specific substances or groups of substances. The number of required sensors is dependent upon the variety of substances to be detected at a specific type of application. From there the flow goes to the flow controller 58, and finally to the vacuum side of the pump 59. The exhaust port from the vacuum pump 59 then goes through another flash arrestor 60, and out the side of the enclosure through a muffler not shown here.

In FIG. 5, the outputs of the flow controller 58 and the two sensor detectors 56 and 57 are analog inputs into the control computer 62 through any required sensor amplifiers 61. The computer controller 62 analyzes the outputs from the sensor detectors 56 and 57 and compares them to pre-determined values that would be consistent with a leak in the pipeline. If the output signals exceed these values, an alarm condition will occur and the proper indicator/alarm relay will be closed.

OUTPUT OF THE SENSOR DETECTOR

Figure 6:
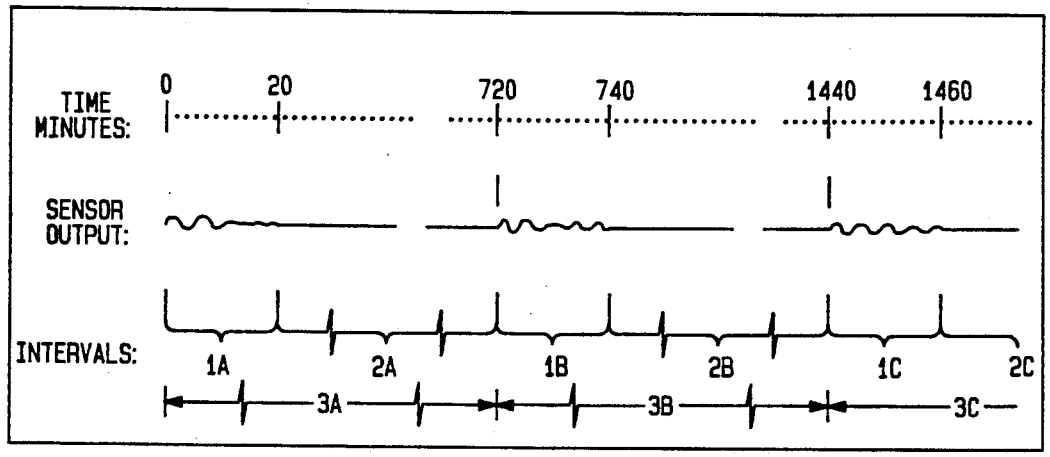
FIG. 6 is a conceptual graph of sensor output, versus time in minutes, divided into intervals or periods of operating cycles, for two conduit lines.

In FIG. 6, it will be seen that, at time "0", aspiration of previously dormant line #1 begins. During the period 1a the contents of the line #1 is passed by the sensor detector. As previously explained in FIG. 5, please recall that this time interval for sensing the column of test medium located in line #1 is dependent on the length of sensor line conduit installed and the rate of flow of the test medium. At the beginning of time 2A the test medium in the now active sensor tube #1 is now tested for traces of any detectable substances. This continues to the end of 2A. Time 3A is the total length of time during which conduit line #1 is aspirated typically 12 hours, as explained in the Sequence of Operations below. At the end of time period 2A/3A the selector valve is actuated and sequence B for aspiration of line #2 begins at the beginning of 1B/3B. The period 1B is the same as was test 1A. This duplicates the period 3A, for Line #2. At the end of 2B/3B the selector valve is reactivated, and the sequence of tests begins on line #1 starting at point 1c/3c.

In FIG. 6, during each of the 20 minute periods of 1, i.e. 1A, 1B, and 1C, which is dependant on the line length and flow rate, the output of the detector/sensor is tested for the presence or any concentration of substances; and the output contents of the sensor conduit have been examined and recorded in the control computer, based on the detector output and time of aspiration.

Figure 7:
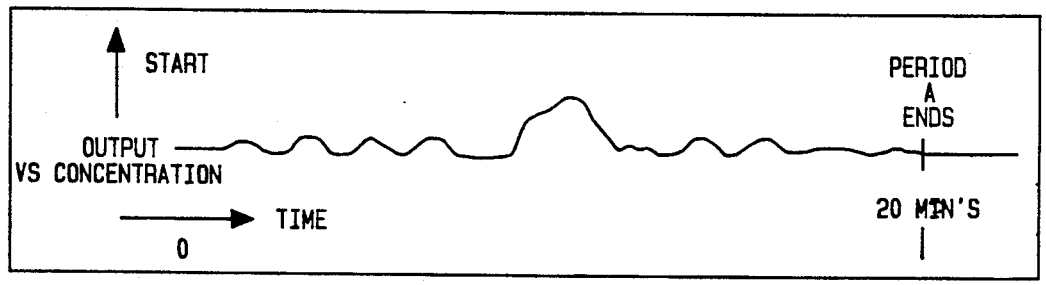
FIG. 7 is a graph of sensor output versus time, for a theoretical installation, from Start until the end of period 1A.

FIG. 7 shows detector output vs. time. The changes in output represent concentrations of detectable substances. These may be naturally occurring in origin, such as, for example, the presence of low levels of swamp gas or other ambient, local chemical, gas or radiation characteristics. On the first test of sensor line conduit #1, the test results are compared to a preset alarm level. The contents of the sensor line conduit on the first test does not represent the normal background. The second test on the sensor line conduit does represent normal background, and thus a "snapshot"/recording of the results of test #2 is made in computer memory, for comparison with operational tests. This snapshot recording becomes the master data used for comparison tests.

Figure 8:
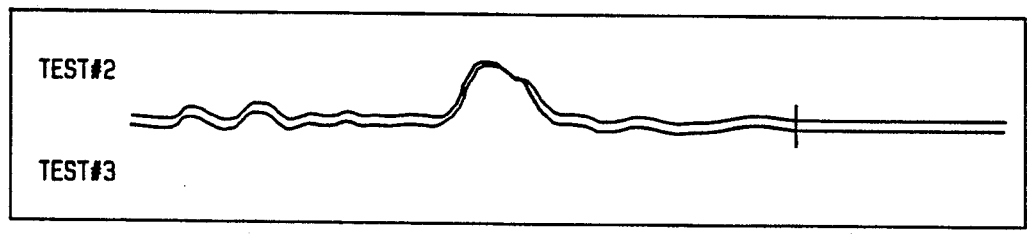
FIG. 8 shows the use of the graph of sensor output versus time of test #2 as a standard, for comparison with the output on test #3, and sequentially on subsequent tests.

In FIG. 8, after recording the test results of test #3 on the sensor line conduit #1, the results of test #2 are compared to test #3. If the variance of the results exceed a limit, the computer recognizes a problem and causes an alarm to be given. Each subsequent test of this sensor line conduit is compared in the same manner.

Figure 9:
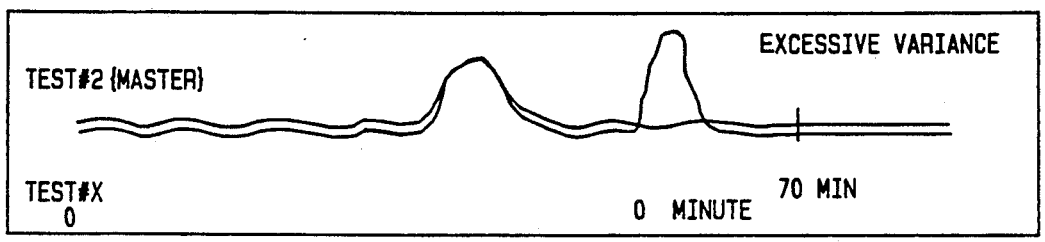
FIG. 9 illustrates the occurrence in test #X, of an excessive variance when compared to the standard from test #2, causing alarm condition, and providing time and flow rate for calculation of distance and location of leak.

In FIG. 9, an excessive variance alarm condition is detected. The variance of this test "X" has exceeded the selected limit at a point in time. This point is equal in length from time point 0 based on: total test time divided by length of installed sensor line conduit. This produces the flow velocity. If the time to the variance is multiplied by this value, the location of the variance can be determined. Using this method, very small occurrences of any detectable substance can be detected and located with reasonable accuracy.

The second testing mode begins at the end of time period "A". The contents of the sensor line conduit has been aspirated. The contents of the conduit now contains a new source of test medium that replaced the original. Detection of low levels of substance requires longer diffusion periods. The recorded output of the sensor/detector remains at a constant background level. If an increase in the concentration of substance occurs in the medium under test, the output change is stored in computer memory. If this change from the value just previously recorded (1 minute data sample interval) exceeds a preset limit, an internal alarm in the computer occurs. If in each of 4 subsequent tests, this level is also increased an external alarm occurs.

NORMAL CONFIGURATION

Figure 10:
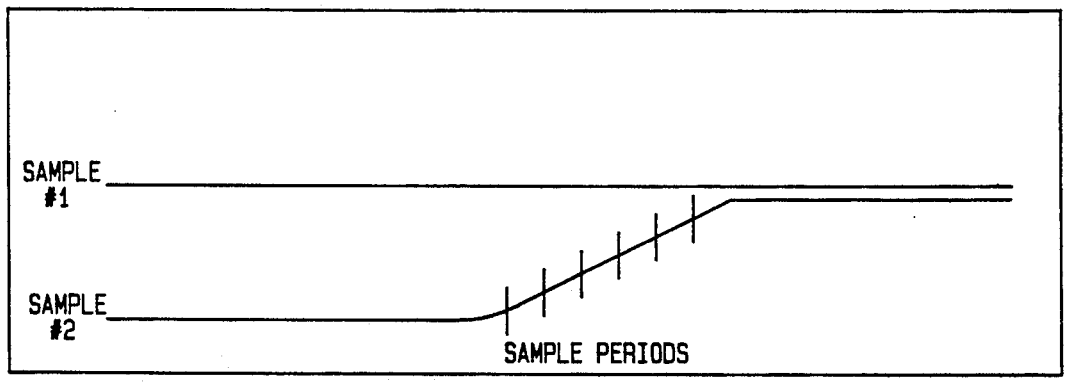
In FIG. 10, normal operating value is shown for sample #1; and an alarm condition is indicated by the result of sensor detector output of sample #2, with rate of change in sample periods.

Normal operating value is seen in FIG. #10, Sample #1. An alarm condition is indicated by the result of sensor detector output of FIG. 10, Sample #2.

A TYPICAL APPLICATION

Spacing of components of the sensor conduit, sensor detector and pump systems is determined by required speed of detection time and the flow rate of test medium. A normal flow velocity of 2.7 ft/sec and a required detection time of 30 minutes requires distance of installed sensor conduit between pump and filter to be less than 4000 ft.

SEQUENCE OF OPERATIONS

The present invention operates in two distinct modes; each providing a different level of leak detection. The detection of small leaks requires a longer time for the small amounts of detectable vapor to diffuse and become trapped inside the sensor tube, sometimes called Low Level Leak Detection. The sensor line sits long enough for the vapors from the leak to reach a concentration level that can be detected by the combustible gas detector. The second mode, emergency response mode, is used to detect larger leaks as quickly as possible after the leak has occurred. Larger leaks provide a source of gas vapors in a high concentration surrounding the sensor tube. After a short period of time, the gas vapors begin to saturate the sensor tube. In this mode, the tube is continually being pumped and the gas is continuously being tested for content of combustible gas and Hydrogen Sulfide. Detection is determined by a rise in the normal background level of these materials. These changes are detected by both sensors, with the Hydrogen Sulfide detector taking 3 to 5 minutes longer.

The dual action system combines the function of both detection techniques to give a wide range of operation. This is accomplished by using two separate sensor tubes buried together along the pipeline and by alternately pumping one tube while the other sits (diffusing possible leak vapors). Every 12 hours (or other interval) later, lines are switched and the pump begins pumping the tube that was being allowed to diffuse. During the time it takes to pump one continuous length of the tube, the air inside the sensor tube is tested for low level leaks. After this time period, the air inside the tube has been replaced by clean air brought in through the Dryer on the other end of the line. This is when the Emergency Response Mode begins and continues until the sensor line is switched to the alternate line.

Each line goes through four steps of operation. First, it is in the low level leak mode when the air is sampled for any vapors that diffused through the tube while it was not being pumped. Second, when the end of the air column inside the sensor tube is reached, the emergency response mode begins. Third, the sensor line is switched to the alternate tube. Following the change, the sensor tube is in a condition of relaxation. During this time the vacuum in the sensor tube is allowed to reach equilibrium with the normal outside air pressure. This return to zero vacuum can take as long as the time it took to move the entire contents of the tube. Once stable, the last step or the diffusion mode of the sensor line begins and continues until the next time the sensor tubes alternate.

The basic control logic of this dual system is that at any given time, one tube will be in the low-level and high-level mode, and the other tube will be in the dormant mode for receiving diffusion. The tubes are switched between the modes at a user-defined interval, typically required by environmental authorities to be 12 hours, controlled by a microprocessor-controlled solenoid valve. This enables the system to detect extremely small leaks over an extended detection period like the original system, yet also provide continuous monitoring and immediate alarming for relatively larger leaks. Extremely small leaks cannot be detected in the high-level mode because of the dilution caused by the moving air in the tubing.

As each analog sample is received, it is compared to an historical standard sample that defines the characteristics of the sample vapor over that length of the tube. If the new sample deviates from the historical sample by more than a user-defined amount, a leak alarm is generated in the form of a digital output.

Additionally, if a low air velocity of approximately 3 fps is maintained and the length of the buried sensor tube is known, small leaks can be detected and located.

Once the air is evacuated from the length of the tube, the control logic switches to the high-level leak detection mode as the pump continues to operate on the same tube.

The analog inputs are averaged for a user-defined time period, usually 1 minute and compared for a deviation from the previous time period average.

If the new value deviates from the previous average by more than the alarm limit and continues to ramp up at this rate for a selected consecutive number of times, usually five, a leak alarm is generated in the form of a digital output.

This high-level mode runs continuously for the selected diffusion time (12 hr) and then switches to the other tube and the sequence begins again.

COMMENTS

It should be explained and understood that the technique of this invention will work with excellent results for the detection of a number of substances, oil, gas, hydrogen sulfide, other hydrocarbons, nuclear radiation, and the like. It is not necessary that the test medium contained in the sensor conduit be air or any other particular gas. It could be distilled water or some solvent. Liquid substances will likewise diffuse into other liquids and alternate test medium, which may require other type of detectors and fluid handler/pumps to be used. Experimental tests with preferred embodiment has been underground and with gas vapors. It can be expected to work as well with liquids, above and below the water table, beneath rivers and reservoirs, as well as above ground. It is intended and understood that, while this application has described primarily the preferred embodiment, the techniques of this invention will work equally well and provide equivalent results on equivalent embodiments.

What I claim is:

1. A process for detection, location and alarm for small, medium and large leaks of liquid or gaseous substances along a path to be monitored, and for continuous, emergency detection and alarm for medium to large leaks, comprising the steps of:

a. locating, along said path to be monitored, an apparatus for determining concentration profiles of said substances along said path, comprising at least two hollow conduits, each filled with a column of test medium; plus sensor means for sensing, detecting and measuring flow times of said test medium and concentration levels of said substances; pump means for moving said test medium at a selected rate of flow through each of said conduits, alternately, and past said sensor means; said column of test medium being defined as the volume of test medium with said substances diffused therein, if any, contained in the length of said conduit before said test medium is moved; and each said conduit being constructed so that said substances can diffuse into said test medium through the walls of said conduit, whereby a distribution corresponding to the amounts of said substances located along said path can be established in said column of test medium;

b. causing one said conduit to lie dormant for receiving diffusion of said substances into said column of test medium of said conduit for a selected diffusion time;

c. concurrently with step b., performing test and monitoring for alarm on another said conduit, comprising the steps of:

(1) determining the concentration profile of said column in said conduit;

(2) comparing said concentration profile with an ambient concentration profile along said path without leaks;

(3) detecting and locating deviations from said ambient profile, and signaling an alarm, whereby small, medium and large leaks are detected, located and alarmed;

(4) after moving said column past said sensing means, moving additional test medium through said conduit and past said sensing means until said selected diffusion time per step b. has transpired;

(5) sensing and measuring concentration levels of said substances in said additional test medium;

(6) comparing said levels with an emergency alarm level, detecting deviations by more than a user-defined amount, and signaling an alarm, whereby medium to large leaks are detected and alarmed;

d. continuing thereafter to repeat the steps of c., alternately, on one of said conduits, and then on the other, while in each said step c., continuing to cause said conduit that is not being tested to lie dormant for receiving diffusion as in step b.

2. A process according to claim 1 wherein step c. (1) comprises the steps of:

(1) moving said column of test medium, at a selected flow rate, through said conduit and past said means for sensing and detecting said substances;

(2) sensing, measuring and recording the flow times and concentration levels versus flow times of said substances, whereby a concentration profile of said substances along said column of test medium is recorded.

3. A process according to claim 1 in which step a. further comprises determining that said length of said hollow conduits does not exceed an emergency conduit length determined by multiplying a selected, emergency detection and alarm time, by said selected flow rate for moving said test medium past said sensor means, whereby emergency detection and alarm for medium to large leaks will be accomplished within said emergency detection and alarm time.

4. A process according to claim 1, further comprising the step of providing only one said pump and sensor means, providing valve means in communication with said pump and sensor means and each of said conduits, and alternately switching between said conduits to cause detection of leaks from each of said conduits, alternately, with only one said pump and sensing means.

5. A process according to claim 1 wherein the hollow conduits of step a. comprise multiple wall tubing wherein an outer wall of said tubing comprises a protective sheath, a first inner wall of said tubing comprises a permeable membrane which permits diffusion of said substances into said test medium through said first inner wall, and a second inner wall of said tubing comprises impermeable material which is perforated to permit diffusion of said substances into the interior of said second inner wall, with said second inner wall transporting said substances to said sensor and detector means after said substances have permeated said first inner wall and said second inner wall, and with the impermeable perforated material of said second inner wall reducing the outflow of said substances from said hollow conduit during movement of said test medium to said sensing and detecting means.

6. A process for detection, location and alarm for small, medium and large leaks of liquid or gaseous substances along a path to be monitored, and for continuous, emergency detection and alarm for medium to large leaks, comprising the steps of:

a. locating at least two hollow conduits along said path to be monitored;
  (1) each said conduit being filled with a column of test medium;
  (2) said column of test medium being defined as the volume of test medium with said substances therein, if any, contained within the length of said conduit before said test medium is moved; and
  (3) each said conduit being constructed so that said substances can diffuse into said test medium through the wall of said conduit, whereby a distribution corresponding to the amounts of said substances located along said path can be established in said column of test medium;

b. causing at least a first said conduit to lie dormant for receiving diffusion of said substances thereinto for a selected diffusion time;

c. concurrently with step b., above, performing tests and monitoring for alarm on a second said conduit, comprising the steps of:
  (1) moving said column of test medium, at a selected flow rate, through said conduit and past means for sensing and detecting said substances;
  (2) sensing, measuring and recording the concentration levels versus flow times of said substances in said column of test medium, whereby a concentration profile of said substances along said column of test medium is recorded;
  (3) comparing said concentration profile with a preselected, ambient concentration profile;
  (4) detecting deviations from said ambient concentration profile by more than a user-defined amount;
  (5) signaling an alarm resulting from said deviations as detected in step c. (4);
  (6) determining and reporting the location of each said deviation by multiplying said flow rate by the flow time of each said deviation, whereby small, medium and large leaks will be located and alarmed; and d. performing step c. on said first conduit while causing said second conduit to lie dormant for diffusion as in step b.;

e. continuing thereafter to repeat step c., alternately, on one said conduit, then on another, while in each said step c., continuing to cause said conduit that is not being tested to lie for diffusion as in step b., above.

7. A process according to claim 6 wherein step c. further comprises steps (7) through (11), as follows:

(7) after moving said column of test medium past said sensing means in steps c. (1) through c.(6), above, continue moving additional test medium at said flow rate through said conduit and past said sensing means until said selected diffusion time per step b. has transpired;

(8) concurrently with step (7) above, sensing and measuring concentration levels of said substances in said addition test medium;

(9) comparing each sensing of concentration level of said substances in said additional test medium with a preselected emergency alarm level of concentration, and detecting deviations from said emergency alarm level by more than a user-defined amount, whereby emergency detection for medium to large leaks of said substances is provided;

(10) signaling an alarm resulting from said deviations detected in step c.(9); and

(11) continuing to perform steps c.(7) through c.(10), until said selected diffusion time per step b. has transpired.

8. A process according to claim 6, wherein step c. includes, concurrently with step c.(1), introducing additional test medium, into said conduit in columnar replacement of said column of test medium, at said selected flow rate; and wherein said additional test medium is introduced into said conduit at the back end of said length of said conduit, behind the direction of movement of said column.

9. A process according to claim 8 wherein said additional test medium is provided free of said substances as it is moved into said conduit.

10. An apparatus for detection, location and alarm for small, medium and large leaks of liquid or gaseous substances along a path to be monitored, and for continuous, emergency detection and alarm for medium to large leaks, comprising:

a. first and second hollow conduits located along said path to be monitored;
 b. each said conduit being filled with a column of test medium;
 c. the test length of said conduits not to exceed an emergency conduit length equal to the product of multiplying a selected, emergency detection and alarm time, by a selected flow rate for moving said test medium past means for sensing and detecting said substances;
 d. each said conduit being constructed so that said substances can diffuse into said test medium through the wall of said conduit;
 e. means for sensing said substances in said test medium;
 f. pump means for moving said test medium at selected flow rates through said conduits and past said sensing means, and being in communication with said sensing means and said conduits;
 g. valve means for selectively directing said movement of test medium from either of said conduits, alternately, through a single said pump means and sensing means;
 h. means for recording a concentration profile of said substances along said column of test medium, comprising means for measuring and recording the flow times and concentration levels versus flow times of said substances sensed in said test medium;
 i. means for comparing said concentration profile with an ambient concentration profile;
 j. means for detecting deviations of said concentration profile from said ambient concentration profile by more than a user-defined amount;
 k. means for signaling an alarm resulting from said deviations;
 l. means for determining and reporting the location of each said deviation;
 m. means for moving additional test medium through said conduit and past said sensing and detecting means;
 n. means for sensing and measuring the concentration levels versus flow times of said substances in said additional test medium;
 o. means for comparing each sensing of concentration level of said substances with a preselected emergency alarm level of concentration; and means for detecting deviations from said preselected emergency alarm level by more than a user-defined amount;
 p. means for signaling an alarm resulting from said deviations;
 q. means for continuing said moving, sensing, measuring, recording, comparing, detecting and alarming means on said additional test medium until a selected diffusion time has transpired; and
 r. control means for determining when said selected diffusion time has transpired and for switching said valve means and directing said movement of said test medium of another said conduit, through said single pump and sensing means.

11. An apparatus according to claim 10, further comprising:

s. control means for causing at least a first said conduit to lie dormant for receiving diffusion of said substances thereinto for a selected diffusion time;
 t. control means for sequentially actuating and performing each of said means of claim 10, in sequence on a second said conduit, concurrently with said dormant diffusion of s.;
 u. control means for continuing thereafter to actuate the means of t., alternately, on one said conduit, then on another, and for concurrently causing said conduit that is not being tested to lie dormant for diffusion as in s.

* * * * *